Patented Jan. 8, 1929.

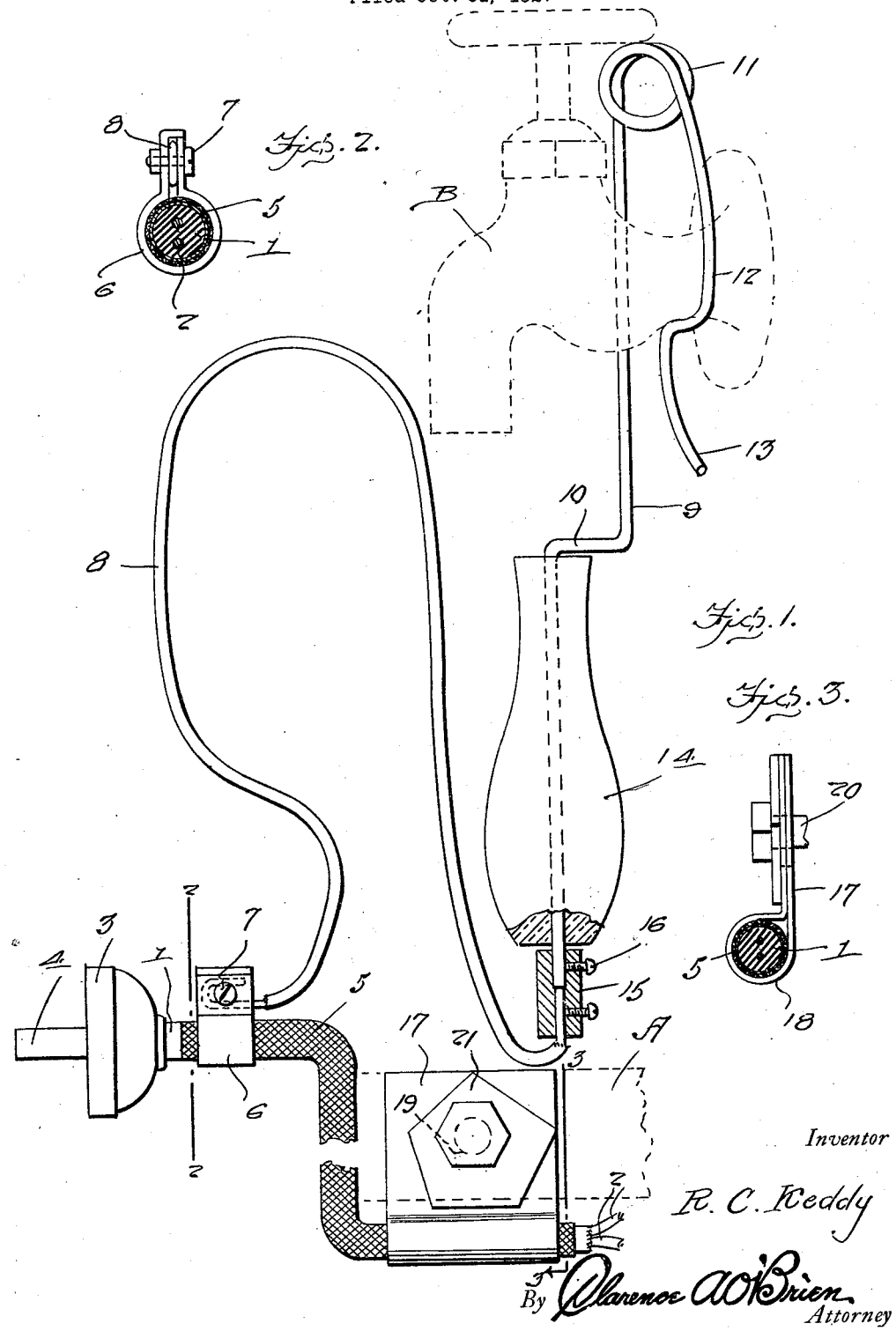

1,697,979

UNITED STATES PATENT OFFICE.

ROY C. KEDDY, OF WEST SOMERVILLE, MASSACHUSETTS.

ELECTRICALLY-OPERATED APPARATUS PROTECTOR.

Application filed October 31, 1927. Serial No. 229,970.

My invention relates to an improvement for protecting electrically operated apparatus, the same including means for normally grounding the metal portion of an electrically operated apparatus, which will eliminate any danger of shock to a person coming in contact with the apparatus, should the same become energized from defective electrical equipment thereof.

Although my protecting device is especially adapted for use in conjunction with the washing machine, it is nevertheless equally practical for use with electrical irons, electrical toasters, or in fact any electrically operated apparatus or utensil.

The main purpose of my invention is to provide a protecting device of the above character which is associated with the conductor cord which furnishes current to the electrical apparatus.

It is also to be understood that no portion of the conventional structure of the apparatus with which this device is associated, need be altered or modified in any manner.

The main object of the same is to provide a grounding means for the metal portion of said apparatus, whereby the same will be normally in connection with the ground, and which may quickly and very conveniently be employed.

Another object resides in including the usual conductor cord to the apparatus in an improved manner, whereby a path is provided in a part of the cord for the grounding of the apparatus, without interfering with the usual manner of connecting the conductors supplying current to the apparatus.

Other very novel objects and advantages of my improved protecting device will become apparent as the same is better understood from the specification and claims to follow.

In the drawing:—

Figure 1 is a side elevation of the device in its entirety.

Fig. 2 is a cross sectional view through the electrical conducting cord, and sheathing thereof, and taken substantially on the line 2—2 of Fig. 1, and Fig. 3 is a cross sectional view taken at the opposite end of the cord, and substantially on the line 3—3 of Fig. 1.

Now for a more detail description of my invention, I refer to the drawing, in which like numerals designate like parts. In dotted lines in the drawings, I represent the imaginary construction of a washing machine A, while by an additional dotted line construction, I illustrate a conventional faucet or in fact any grounded member B. My invention includes the conductor cord 1, adapted to insulate the conductor wires 2, contained therein.

One end portion of the conductor wires are in electrical connection with a conventional plug member 3, the plug including the blade members 4. The opposite ends of the cord may be permanently, or otherwise in electrical connection with the usual electrical motor of the washing machine. The cord is provided throughout its entire length with a metallic casing 5, which may be braided or woven around the cord in a manner to entirely enclose the same.

This sheathing is of a conductive material, and is preferably of copper. A metallic strap 6 is clamped around the sheathing at the plug end of the cord, and is adapted at its end portions to receive a threaded bolt 7 for securely fastening one exposed end of a connecting wire 8. The ground connection of my invention, includes a single strand of substantially heavy wire 9, the upper portion of which is bent at an offset relation to the bottom portion of same by an angular bend 10. The upper portion of the strand is convoluted at 11 to provide a spring loop, while the free end portion thereof is bent downwardly and from thence inwardly to provide a spring hook arm 12.

An outward extension 13 is formed at the end thereof, whereby this hooked arm portion of the strand may be sprung over the bulkiness of a water pipe, faucet, or the like. The handle 14 is formed with a longitudinal bore therethrough, through which the lower end of the wire 9 is adapted to depend. The elongated collar 15 is adapted to receive the lower end of the strand as well as the opposite end of the connecting wire 8, and wherein the said end portions are secured by set screws 16.

An elongated plate 17 is bent upon itself to provide an offset loop 18 in which the opposite end portion of the casing 5 is adapted to be clamped. The end portions of the plate 17 are formed with registering holes 19, through which a bolt 20, which may be a structural bolt of the washing machine, is adapted to extend to clamp the end portions of the plate together.

Secured between the head portion of the bolt, and the adjacent side of the plate 17, is a latch plate 21. The plate is arranged eccentrically on the bolt so that the eccentric edge portions of the plate may be swung to a downward position, for tightly contracting the loop 18, around the cord, in a manner clearly shown in Figs. 1 and 3 of the drawing.

It will thus be seen that in the event should any part of the electrical equipment break down, electrically through defective material, or be in electrical contact because of inferior workmanship or wear, and should thereby energize the metal parts of the machine, the same will be grounded through sheathing 5, clamp 6, connecting wire 8, and the strand 9 to the ground B. The sheathing is provided on the cord, whereby all structure will be grounded completely through it, provided the attachments are employed, and the apparatus will therefore be at ground potential, thus giving protection to a person making contact with the apparatus while in contact with the ground.

Having thus described my invention, what I claim as new is:—

1. In a grounding device for electrically operated apparatus, a conductor cord containing the usual conductor wires, said cord being provided with suitable connections for furnishing electrical current to the apparatus, a longitudinal metallic element on said cord, one end of said element being in contact with the apparatus, and a ground connection at the opposite end of the element.

2. In a grounding device for electrically operated apparatus, a conductor cord containing the usual conductor wires, said cord being provided with a suitable connection for furnishing the electrical current through the apparatus, a metallic covering for said cord, one end of said covering being in contact with the apparatus, and a ground connection at the opposite end of the element, said ground connection being provided with a spring clip at its ground engaging end.

3. In a grounding device for electrically operated apparatus, a conductor cord containing the usual conductor wires, said cord being provided with metallic connections for furnishing electrical current to the apparatus, a longitudinal metallic covering on said cord, a ground connection at one end of said covering, and a clamp at the opposite end of the covering for connecting the same to the metal parts of the apparatus.

4. In a grounding device for electrically operated apparatus, a conductor cord containing the usual conductor wires, said cord being provided with metallic connections for furnishing electrical current to the apparatus, a longitudinal metallic covering on said cord, a ground connected at one end of said covering, a clamp at the opposite end of the covering for connecting the same to the metal parts of the apparatus, said clamp including a plate adapted to be bent upon itself to form a loop, and a pivotal member associated with said plate for contracting said loop.

In testimony whereof I affix my signature.

ROY C. KEDDY.